US012808338B2

(12) United States Patent
Kiwan et al.

(10) Patent No.: US 12,808,338 B2
(45) Date of Patent: Nov. 24, 2026

(54) METHODS AND SYSTEMS FOR DIAGNOSING FOUR OXYGEN SENSOR SYSTEM

(71) Applicant: Ford Global Technologies, LLC, Dearborn, MI (US)

(72) Inventors: Rani Kiwan, West Bloomfield, MI (US); Yusef Sadat-Hossieny, Cincinnati, OH (US); Chris Paul Glugla, Macomb, MI (US); Kenneth John Behr, Farmington Hills, MI (US); Michael Uhrich, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 18/978,879

(22) Filed: Dec. 12, 2024

(65) Prior Publication Data

US 2026/0168456 A1 Jun. 18, 2026

(51) Int. Cl.
*F02D 41/02* (2006.01)
*F02D 41/38* (2006.01)

(52) U.S. Cl.
CPC ................................ *F02D 41/3809* (2013.01)

(58) Field of Classification Search
CPC .. F02D 41/1441; F02D 41/1495; F02D 41/22; F02D 41/222; F02D 2041/223; F02D 2200/0602; F02D 2041/224; G01M 15/102; G01M 15/104
See application file for complete search history.

(56) References Cited

U.S. PATENT DOCUMENTS 6,736,121 B2 * 5/2004 Gopichandra .......... F02D 41/22 73/114.73
7,266,942 B2 9/2007 Iihoshi et al.
7,549,283 B2 * 6/2009 Kerns ................. F01N 13/0093 60/276
7,558,667 B2 * 7/2009 Kida
8,118,006 B2 2/2012 Pursifull
9,212,610 B2 12/2015 Chen et al.
10,371,080 B2 * 8/2019 Franz .................... F02D 41/222
(Continued)

FOREIGN PATENT DOCUMENTS

CN 108049978 B 5/2018
GB 2391331 A * 2/2004 ......... F02D 41/1453
(Continued)

OTHER PUBLICATIONS

Kiwan, R. et al., "Methods and Systems for V8 Engine Fuel Control," U.S. Appl. No. 18/793,530, filed Aug. 2, 2024, 30 pages.
(Continued)

*Primary Examiner* — George C Jin
*Assistant Examiner* — Teuta B Holbrook
(74) *Attorney, Agent, or Firm* — McCoy Russell LLP

(57) ABSTRACT

Systems and methods for evaluating operation of a plurality of upstream and downstream oxygen sensors are disclosed. In one example, the air to fuel patterns may be arranged in an order to reduce an amount of time it takes to evaluate upstream and downstream oxygen sensors. The oxygen sensor evaluation may be suitable to detect sensor miswiring and sensor degradation.

18 Claims, 5 Drawing Sheets

V8 mode Firing order: 1-5-4-8-6-3-7-2

(56) References Cited

U.S. PATENT DOCUMENTS

| | | | | |
|---|---|---|---|---|
| 2006/0137325 | A1* | 6/2006 | Ikemoto | F02D 41/0235 60/276 |
| 2008/0059041 | A1* | 3/2008 | Kida | F02D 41/1443 701/101 |
| 2009/0056686 | A1* | 3/2009 | Suzuki | F02D 41/2454 123/703 |
| 2009/0241925 | A1* | 10/2009 | Behr | F02D 41/0082 123/690 |
| 2011/0106411 | A1 | 5/2011 | Anilovich et al. | |
| 2011/0295491 | A1* | 12/2011 | Kurahashi | F02D 41/1454 701/103 |
| 2017/0122227 | A1* | 5/2017 | Rollinger | F02D 35/02 |
| 2017/0350332 | A1* | 12/2017 | Martin | F02D 41/123 |
| 2023/0250774 | A1* | 8/2023 | Glugla | G01M 15/11 123/54.4 |

FOREIGN PATENT DOCUMENTS

| | | | | | |
|---|---|---|---|---|---|
| JP | H10153140 | A | * | 6/1998 | F02D 41/1458 |
| JP | 2005009384 | A | * | 1/2005 | |
| JP | 4338586 | B2 | | 10/2009 | |
| JP | 2017172356 | A | * | 9/2017 | |

OTHER PUBLICATIONS

Kiwan, R. et al., "Methods and Systems for Verifying Oxygen Sensor Connections," U.S. Appl. No. 18/793,568, filed Aug. 2, 2024, 39 pages.

Kiwan, R. et al., "Feedback Fuel Control For Dual Path Exhaust System," U.S. Appl. No. 18/801,055, filed Aug. 12, 2024, 34 pages.

* cited by examiner

METHODS AND SYSTEMS FOR DIAGNOSING FOUR OXYGEN SENSOR SYSTEM

FIELD

The present description relates to a system and methods for verifying intended operation of four universal exhaust gas oxygen sensors in an engine system.

BACKGROUND AND SUMMARY

An internal combustion engine may be configured with oxygen sensors. The oxygen sensors may provide feedback for adjusting the engine's air-fuel ratio. Further, the oxygen sensors may include universal exhaust gas oxygen sensors (UEGOs) and/or heated exhaust gas oxygen sensors (HEGOs). The UEGOs may be positioned to sense exhaust gases that form directly from engine cylinders and the HEGOs may be positioned to sense gases that are within or downstream of a catalyst.

A method for operating an engine is provided. The method comprises commanding each of two groups of fuel injectors to generate one of a stoichiometric, rich, or lean air-fuel ratio in each of two pairs of cylinders and to generate at least four different cylinder air-fuel ratio patterns in the two pairs of cylinders during at least four different time intervals of an oxygen sensor diagnostic. In this way, it is possible to identify, initially or during and throughout a life of a vehicle, whether an oxygen sensor may be miswired, output an unexpected signal, or not respond in an expected way.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
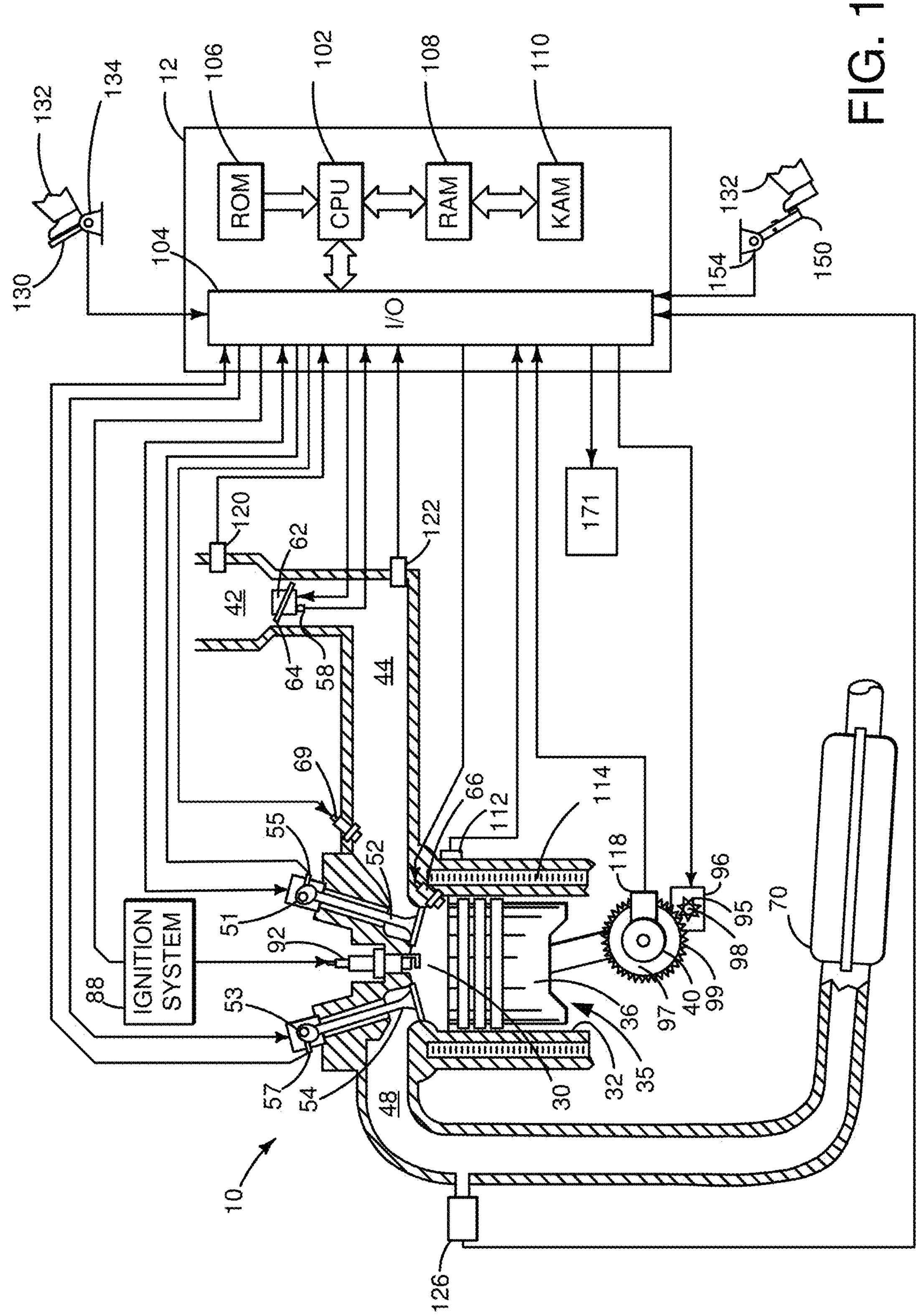
FIG. 1 is a schematic diagram of a single cylinder of an engine.
Figure 2:
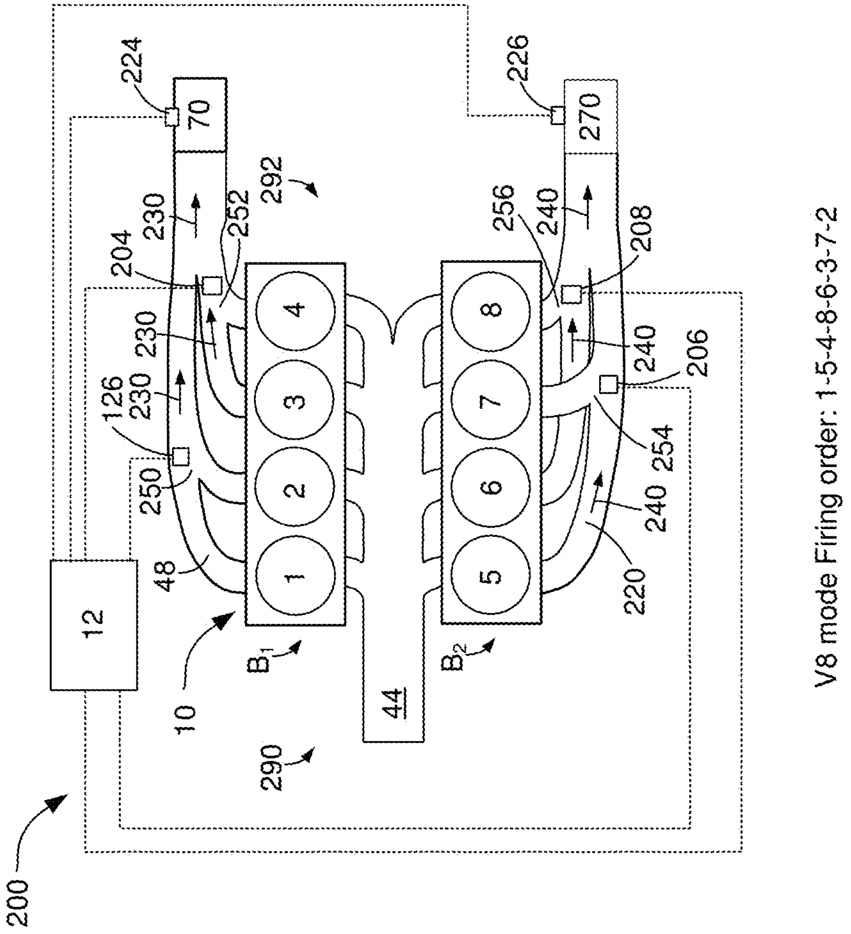
FIG. 2 is a schematic diagram of an example eight-cylinder engine with oxygen sensors.

The present description is related to diagnosing operation of a plurality of oxygen sensors in an exhaust system of an internal combustion engine. The diagnostics may evaluate both UEGO sensors and HEGO sensors. Further, the system may include four UEGO sensors and two HEGO sensors. The diagnostic may be configured to minimize an amount of time it takes to determine whether or not UEGO and HEGO sensors are operating as may be desired. The amount of time it takes to evaluate the oxygen sensors may be reduced by developing air-fuel control patterns that may provide insight to more than one operating aspect of the oxygen sensors. Additionally, the order by which the air-fuel control patterns are applied may also help to reduce the duration of the oxygen sensor diagnostic. The engine may be an internal combustion engine as shown in FIGS. 1 and 2. Different patterns of air-fuel mixtures may be supplied to the engine as shown in FIGS. 3-7 to support oxygen sensor diagnostics. A method for operating an engine using one of the described air-fuel ratio sequences is shown in FIG. 8.

A bank of four cylinders may be controlled according to output of a single UEGO sensor. However, it may be possible to more accurately determine air-fuel ratios of each cylinder of a bank of cylinders when a sole UEGO sensor is configured to sample exhaust gases from two of four cylinders. Thus, if one UEGO sensor is applied to sense exhaust gases of two cylinders of a cylinder bank and a second UEGO sensor is applied to sense exhaust gases of two other cylinders of the cylinder bank, accuracy of air-fuel ratio estimates for cylinders of a cylinder bank may be increased.

More accurate air-fuel ratio readings may allow air-fuel ratios of an engine to be controlled with higher accuracy so that engine emissions may be lowered. Nevertheless, additional oxygen sensors may lead to more complex oxygen sensor diagnostics and longer diagnostic evaluation times. The longer and more complex diagnostics may slow vehicle assembly lines and lower productivity. Therefore, it may be desirable to provide a way of diagnosing four upstream oxygen sensors and two downstream oxygen sensors that does not significantly increase system complexity and execution time for oxygen sensor diagnostics.

The inventors herein have recognized that oxygen sensor diagnostics may be developed to reduce an amount of time it takes to perform the diagnostic and thoroughly evaluate a plurality of oxygen sensors even when the number of oxygen sensors is relatively large. In order to realize this recognition, the inventors have developed a method for operating an engine, comprising: commanding each of two groups of fuel injectors to generate one of a stoichiometric, rich, or lean air-fuel ratio in each of two pairs of cylinders and to generate at least four different cylinder air-fuel ratio patterns in the two pairs of cylinders during at least four different time intervals of an oxygen sensor diagnostic.

By commanding air-fuel ratios of different cylinders to different values and generating air-fuel ratio patterns, it may be possible to reduce an amount of time it takes for an oxygen sensor diagnostic sequence to execute. Further, the pattern of air-fuel ratios may be generated such that each oxygen sensor is exercised in a way that may reveal the presence or absence of degradation or unexpected oxygen sensor operation. Consequently, a vehicle's entire set of oxygen sensors may be thoroughly evaluated in a short period of time.

The present description may provide several advantages. In particular, the approach may provide shorter duration diagnostics. Further, the approach may reduce oxygen sensor diagnostic complexity via generating a few highly useful air-fuel ratio patterns. Additionally, the approach may allow efficient catalyst operation while performing oxygen sensor diagnostics.

The above advantages and other advantages, and features of the present description will be readily apparent from the following Detailed Description when taken alone or in connection with the accompanying drawings.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via an energy transfer device (e.g., a chain). In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust poppet valve may be operated by an intake cam 51 and an exhaust cam 53. The position of intake cam 51 may be determined by intake cam sensor 55. The position of exhaust cam 53 may be determined by exhaust cam sensor 57.

Direct fuel injector 66 is shown positioned to inject fuel directly into cylinder 35, which is known to those skilled in the art as direct injection. Direct fuel injector 66 delivers liquid fuel in proportion to a voltage pulse width or fuel injector pulse width of a signal from controller 12. Fuel is delivered to fuel injector 66 by a fuel system (not shown) including a fuel tank, fuel pump, and fuel rail (not shown). Alternatively, or in addition, engine 10 may also include a port fuel injector 69 for each cylinder, which is known to those skilled in the art as port fuel injection. Port fuel injector 69 delivers liquid fuel in proportion to a voltage pulse width or fuel injector pulse width of a signal from controller 12. Fuel may be supplied to port fuel injector 69 via the fuel system (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-exclusive memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing a distance displaced by human 132; a position sensor 154 coupled to caliper control pedal 150 for sensing distance displaced by human 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

In some examples, the engine may be coupled to an electric motor/battery system in a hybrid vehicle. Further, controller 12 may receive input and communicate conditions such as degradation of components to illuminate a light, or alternatively, to human/machine interface 171 (touch screen display and input device).

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, a plan view 200 of engine 10 is shown. Engine 10 is the same engine as shown in FIG. 1, but in FIG. 2, all engine cylinders are shown. In this example, the engine's cylinders are numbered 1 through 8. The cylinders are supplied with air via intake manifold 44. A first bank of cylinders $B_1$ includes cylinders 1-4 and a second bank of cylinders $B_2$ includes cylinders 5-8. Cylinders 1-4 are shown in fluidic communication with exhaust manifold 48 and cylinders 5-8 are shown in fluidic communication with exhaust manifold 220. Each of cylinders 1-8 includes fuel injectors, spark plug, and intake/exhaust valves as shown in FIG. 1. Front 290 and rear 292 of engine 10 are as indicated.

A first oxygen sensor 126 (UEGO) is shown configured to sense exhaust gases from cylinders numbered 1 and 2 at exhaust gas confluence location 250 for cylinder numbers 1 and 2. A second oxygen sensor 204 (UEGO) is shown configured to sense exhaust gases from cylinders 3 and 4 at exhaust gas confluence location 252 for cylinder numbers 3 and 4. A third oxygen sensor 206 (UEGO) is shown configured to sense exhaust gases from cylinders numbered 5 and 7 at exhaust gas confluence location 254 for cylinder numbers 5 and 7. A fourth oxygen sensor 208 (UEGO) is shown configured to sense exhaust gases from cylinders 6 and 8 at exhaust gas confluence location 256 for cylinder numbers 6 and 8. There are no cylinders that are downstream of any of the exhaust gas sensors according to exhaust flow from the cylinders as indicated by arrows 230 and 240.

Output of first oxygen sensor 126 may be applied as fuel-air ratio feedback for controlling fuel that is supplied to cylinders numbered 1 and 2 via port and/or direct fuel injectors. Output of second oxygen sensor 204 may be applied as fuel-air ratio feedback for controlling fuel that is supplied to cylinders numbered 3 and 4 via port and/or direct fuel injectors. Output of third oxygen sensor 206 may be applied as fuel-air ratio feedback for controlling fuel that is supplied to cylinders numbered 5 and 7 via port and/or direct fuel injectors. Output of fourth oxygen sensor 208 may be applied as fuel-air ratio feedback for controlling fuel that is supplied to cylinders numbered 6 and 8 via port and/or direct fuel injectors. Thus, first oxygen sensor 126 is associated with cylinders numbered 1 and 2, second oxygen sensor 204 is associated with cylinders numbered 3 and 4, third oxygen sensor 206 is associated with cylinders numbered 5 and 7, and fourth oxygen sensor 208 is associated with cylinders numbered 6 and 8.

Engine 10 also includes a first downstream oxygen sensor 224 that is configured to sense exhaust gases from cylinder bank $B_1$ at a location within or downstream of catalyst 70, and a second downstream oxygen sensor 226 that is configured to sense exhaust gases from cylinder bank $B_2$ at a location within or downstream of catalyst 270. The downstream oxygen sensor 224 or 226 may be a heated exhaust gas oxygen sensor (HEGO) that may be considered a two state sensor.

The system of FIGS. 1 and 2 provides for an engine system, comprising: an internal combustion engine comprising a first bank of cylinders and a second bank of cylinders, and at least eight fuel injectors including at least one fuel injector for each cylinder of the first bank of cylinders and at least one for each cylinder of the second bank; a first oxygen sensor configured to sense gases exhausted from first and second cylinders of the first bank of cylinders; a second oxygen sensor configured to sense gases exhausted from third and fourth cylinders of the first bank of cylinders; a third oxygen sensor configured to sense gases exhausted from fifth and sixth cylinders of the second bank of cylinders; a fourth oxygen sensor configured to sense gases exhausted from seventh and eighth cylinders of the second bank of cylinders; and a controller including executable instructions stored in non-transitory memory that cause the controller to command the at least eight fuel injectors to generate one of a stoichiometric, rich, or lean air-fuel ratio in each cylinder of the first bank of cylinders and each cylinder of the second bank and to generate at least four different cylinder air-fuel ratio patterns in the first bank of cylinders and the second bank of cylinders during at least four different time intervals of an oxygen sensor diagnostic sequence. In a first example, the engine system includes where the at least four different cylinder air-fuel ratio patterns are arranged in an order to reduce a time duration of the oxygen sensor diagnostic sequence. In a second example that may include the first example, the engine system further comprises additional executable instructions that cause the controller to compare outputs of the first oxygen sensor, the second oxygen sensor, the third oxygen sensor, and the fourth oxygen sensor to the at least four different cylinder air-fuel ratio patterns and identify a presence or absence of miswiring of each of the first oxygen sensor, the second oxygen sensor, the third oxygen sensor, and the fourth oxygen sensor. In a third example that may include one or both of the first and second examples, the engine system further comprises additional executable instructions that cause the controller to compare outputs of the first oxygen sensor, the second oxygen sensor, the third oxygen sensor, and the fourth oxygen sensor to the at least four different cylinder air-fuel ratio patterns and identify a presence or absence of degradation of each of the first oxygen sensor, the second oxygen sensor, the third oxygen sensor, and the fourth oxygen sensor. In a fourth example that may include one or more of the first through third examples, the engine system further comprises a first downstream oxygen sensor arranged in a fifth exhaust passage and comparing outputs of the first downstream oxygen sensor to the at least four different cylinder air-fuel ratio patterns and additional executable instructions for identifying a presence or absence of miswiring of the first downstream oxygen sensor. In a fifth example that may include one or more of the first through fourth examples, the engine system further comprises a second downstream oxygen sensor arranged in a sixth exhaust passage and additional executable instructions for comparing outputs of the second downstream oxygen sensor to the at least four different cylinder air-fuel ratio patterns and identifying the presence or absence of miswiring of the second downstream oxygen sensor. In a sixth example that may include one or more of the first through fifth examples, the engine system further comprises additional executable instructions that cause the controller to indicate the presence or absence of degradation of each of the first downstream oxygen sensor and the second downstream oxygen sensor.

Figure 3:
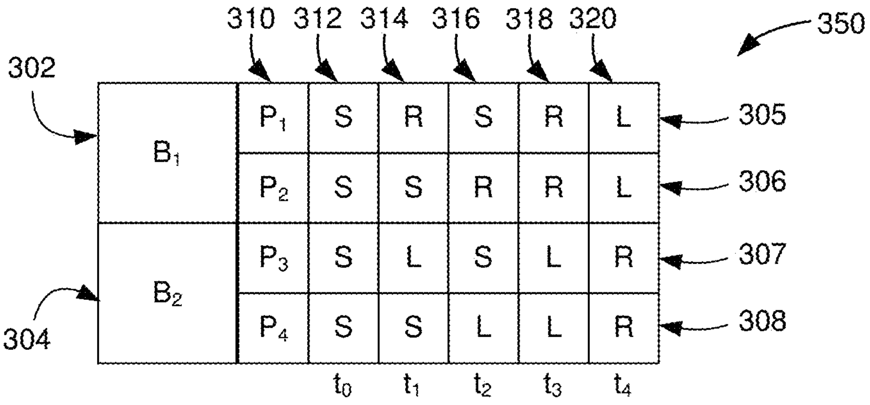
FIGS. 3-7 show example air-fuel control sequences for diagnosing an engine system that includes four UEGO sensors and two HEGO sensors.

Referring now to FIG. 3, a table 350 illustrating an air-fuel ratio sequence for diagnosing four different upstream oxygen sensors (UEGOs) is shown. Further, the air-fuel ratio sequence that is shown in FIG. 3 may be applied to diagnose two different downstream oxygen sensors (HEGOs). Table 350 includes a first cell 302 that brackets rows 305 and 306 to indicate that these rows and their associated columns are associated with the first bank of cylinders $B_1$. Table 350 also includes a second cell 304 that brackets rows 307 and 308 to indicate that these rows and their associated columns are associated with the second bank of cylinders $B_2$. Table 350 includes a first column 310 that houses indicators for cylinder pairs (e.g., $P_1$ indicates first cylinder pair (cylinders one and two), $P_2$ indicates second cylinder pair (cylinders three and four), $P_3$ indicates third cylinder pair (cylinders five and seven), and $P_4$ indicates fourth cylinder pair (cylinders six and eight)) that are associated with air-fuel ratios that are applied during phases of the oxygen sensor diagnostic sequence that is shown in Table 350. The five phases of the oxygen sensor diagnostic sequence are shown in columns 312-320.

Air-fuel ratios that are combusted in cylinders (commanded air-fuel ratios) and exhausted during the air-fuel sequence for diagnosing oxygen sensors are indicated by letters S (stoichiometric air-fuel ratio), R (rich air-fuel ratio), and L (lean air-fuel ratio). For example, row 305, column 312 indicates that the phase one air-fuel ratio for cylinder pair $P_1$ is a stoichiometric air-fuel ratio. Further, row 306, column 314 indicates that the phase two air-fuel ratio for cylinder pair $P_2$ is a stoichiometric air-fuel ratio, and so on. Along the bottom of table 350, time intervals (e.g., $t_0$-$t_4$) are shown to illustrate which time intervals are associated with air-fuel ratios during the air-fuel ratio sequence for diagnosing oxygen sensors. For example, time interval $t_0$, indicates that column 312 holds air-fuel mixture designations that are associated with the first phase of the air-fuel ratio sequence for diagnosing oxygen sensors. Time interval $t_1$, indicates that column 314 holds air-fuel ratio mixture designations that are associated with the second phase of the air-fuel ratio sequence for diagnosing oxygen sensors, and so on. The time intervals $t_0$-$t_4$ may be of different time durations and time interval $t_1$ immediately follows time interval $t_0$, and time interval $t_2$ immediately follows time interval $t_1$, and so on.

The first phase of the air-fuel sequence for diagnosing four upstream oxygen sensors and two downstream oxygen sensor in time interval $t_0$ includes combusting stoichiometric air-fuel mixtures in $P_1$, $P_2$, $P_3$, and $P_4$ cylinder pairs. The second phase of the air-fuel sequence for diagnosing four upstream oxygen sensors and two downstream oxygen sensor in time interval $t_1$ includes combusting a rich air-fuel mixture in $P_1$ cylinder pair, combusting a stoichiometric air-fuel mixture in $P_2$ cylinder pair, combusting a lean air-fuel mixture in $P_3$ cylinder pair, and combusting a stoichiometric air-fuel mixture in $P_4$ cylinder pair. The third phase of the air-fuel sequence for diagnosing four upstream oxygen sensors and two downstream oxygen sensor in time interval $t_2$ includes combusting a stoichiometric air-fuel mixture in $P_1$ cylinder pair, combusting a rich air-fuel mixture in $P_2$ cylinder pair, combusting a stoichiometric air-fuel mixture in $P_3$ cylinder pair, and combusting a lean air-fuel mixture in $P_4$ cylinder pair. The fourth phase of the air-fuel sequence for diagnosing four upstream oxygen sensors and two downstream oxygen sensor in time interval $t_3$ includes combusting a rich air-fuel mixture in $P_1$ cylinder pair, combusting a rich air-fuel mixture in $P_2$ cylinder pair, combusting a lean air-fuel mixture in $P_3$ cylinder pair, and combusting a lean air-fuel mixture in $P_4$ cylinder pair. The fifth phase of the air-fuel sequence for diagnosing four upstream oxygen sensors and two downstream oxygen sensor in time interval $t_4$ includes combusting a lean air-fuel mixture in $P_1$ cylinder pair, combusting a lean air-fuel mixture in $P_2$ cylinder pair, combusting a rich air-fuel mixture in $P_3$ cylinder pair, and combusting a rich air-fuel mixture in $P_4$ cylinder pair.

The air-fuel sequence for diagnosing oxygen sensors as shown in FIG. 3 may be applied to determine the presence or absence of miswired oxygen sensors such that wiring of each upstream oxygen sensor is evaluated with respect to each upstream oxygen sensor controller input. The oxygen sensor diagnostic may include sets of air-fuel commands (realized by fuel commands) such that each cylinder pair is commanded differently from the other cylinder pairs in at least one command.

Brackets { } are used herein to indicate air-fuel ratio commands for a phase of the air-fuel sequence for diagnosing oxygen sensors. Within the brackets four air-fuel ratio commands (e.g., {S,R,R,S}), one for each cylinder pair, are shown. The left most air-fuel command in the brackets represents the fuel command for the first pair of cylinders (cylinder numbers one and two), the second from the left air-fuel ratio command in the brackets represents the air-fuel command for the second pair of cylinders (cylinder numbers three and four), the third from the left air-fuel ratio command in the brackets represents the air-fuel ratio command for the third pair of cylinders (cylinder numbers five and seven), and the fourth air-fuel ratio command from the left most bracket represents the air-fuel ratio command for the fourth pair of cylinders (cylinder numbers six and eight). Herein $U_k$ represents an upstream oxygen sensor that is associated with a $k^{th}$ cylinder pair $P_k$, where k is an integer from 1-4. $I_n$ represents a controller input for an upstream oxygen sensor output that is associated with cylinder pair $P_n$, where n is an integer from 1-4. The notation $U_k \rightarrow I_n$ indicates an oxygen sensor k that is connected to a controller input n. Therefore, if k=n, $U_k$ is wired correctly. If k≠n, $U_k$ is miswired.

An {S,S,S,R} command sequence may be applied to detect miswirings of upstream oxygen sensor number four to oxygen sensor inputs one ($U_4 \rightarrow I_1$), two ($U_4 \rightarrow I_2$), and three ($U_4 \rightarrow I_3$) since cylinder pair $P_4$ is the sole cylinder pair that is commanded rich. Note that {S,S,S,L} command sequence may be applied to detect miswiring of upstream oxygen sensor number four in a similar way.

An {S,S,R,R} command sequence may be applied to detect a subset miswirings of upstream oxygen sensor number four to oxygen sensor inputs one ($U_4 \rightarrow I_1$) and two ($U_4 \rightarrow I_2$) since both cylinder pairs $P_3$ and $P_4$ are commanded rich. Note that a {S,S,L,L} command may be applied to detect miswiring of upstream oxygen sensor number four in a similar way. Further, {S,S,R,R} may be applied to detect a subset of miswirings of upstream oxygen sensor number three.

An {S,R,S,R} command sequence may be applied to detect a subset miswirings of upstream oxygen sensor number four to oxygen sensor inputs one ($U_4 \rightarrow I_1$) and three ($U_4 \rightarrow I_3$) since both cylinder pairs $P_2$ and $P_4$ are commanded rich. Note that combining commands {S,S,R,R} and {S,R,S,R} enables detecting of miswiring of upstream oxygen sensor number four to upstream inputs one, two, and three. Further, combining sequences {S,S,L,L} and {S,L,S,L}; {S,S,R,R} and {S,L,S,L}; and {S,S,L,L} and {S,R,S,R} enables detecting of miswiring of the fourth upstream oxygen sensor to the first, second, and third upstream oxygen sensor inputs.

An {S,S,L,R} command sequence may be applied to detect miswirings of upstream oxygen sensor number four to oxygen sensor inputs one ($U_4 \rightarrow I_1$), two ($U_4 \rightarrow I_2$), and three ($U_4 \rightarrow I_3$) since cylinder pair $P_4$ is the sole cylinder pair that is commanded rich. Further, the {S,S,L,R} command sequence may be applied to detect miswirings of upstream oxygen sensor number three to oxygen sensor inputs one ($U_3 \rightarrow I_1$), two ($U_3 \rightarrow I_2$), and four ($U_3 \rightarrow I_4$). An {S,S,L,R} command may be preferred to an {S,S,S,R} command since it may be applied to identify all potential miswiring of both upstream oxygen sensors associated with third and fourth cylinder pairs, while {S,S,S,R} can exclusively identify all potential miswiring with upstream oxygen sensor associated with the fourth cylinder pair.

An {R,R,R,S} or an {L,L,L,S} command sequence may be applied to detect miswirings of upstream oxygen sensor number four to oxygen sensor inputs one ($U_4 \rightarrow I_1$), two ($U_4 \rightarrow I_2$), and three ($U_4 \rightarrow I_3$) since cylinder pair $P_4$ is the sole cylinder pair that is commanded with a stoichiometric air-fuel mixture.

During an oxygen sensor diagnostic, the air-fuel ratios for pairs of engine cylinders are commanded as shown in table 350. In particular, {S,S,S,S} is commanded during time interval $t_0$, {R,S,L,S} is commanded during time interval $t_1$, {S,R,S,L} is commanded during time interval $t_2$, {R,R,L,L} is commanded during time interval $t_3$, and {L,L,R,R} is commanded during time interval $t_4$. This air-fuel command sequence allows each upstream oxygen sensor to be exposed (in at least one phase) to exhaust gases of a particular pair of cylinders that have combusted a rich air-fuel mixture. This sequence of commanded air-fuel ratios allows the oxygen sensor diagnostic to verify whether or not each upstream oxygen sensor responds to combustion products of a rich air-fuel mixture. The {R,R,L,L} command at time $t_3$ causes the upstream oxygen sensor that is associated with $P_1$ to be exposed to combustion products of rich air-fuel mixtures in a first cylinder pair ($P_1$) so that it may be determined whether or not the upstream oxygen sensor that is associated with the first cylinder pair ($P_1$) responds with an indication of a rich air-fuel mixture. Similarly, the {R,R,L,L} command during time interval $t_3$ causes the upstream oxygen sensor that is associated with $P_2$ to be exposed to combustion products of rich air-fuel mixtures in a second cylinder pair ($P_2$) so that it may be determined whether or not the upstream oxygen sensor that is associated with the second cylinder pair ($P_2$) responds with an indication of a rich air-fuel mixture. The {L,L,R,R} command during time interval $t_4$ causes the upstream oxygen sensor that is associated with $P_3$ to be exposed to combustion products of rich air-fuel mixtures in a third cylinder pair ($P_3$) so that it may be determined whether or not the upstream oxygen sensor that is associated with the third cylinder pair ($P_3$) responds with an indication of a rich air-fuel mixture. Likewise, the {L,L,R,R} command during time interval $t_4$ causes the upstream oxygen sensor that is associated with $P_4$ to be exposed to combustion products of rich air-fuel mixtures in a fourth cylinder pair ($P_4$) so that it may be determined whether or not the upstream oxygen sensor that is associated with the fourth cylinder pair ($P_4$) responds with an indication of a rich air-fuel mixture.

The sequence of commanded air-fuel ratios shown in FIG. 3 also allows the oxygen sensor diagnostic to verify whether or not each upstream oxygen sensor responds to combustion products of a lean air-fuel mixture. The {L,L,R,R} command during time interval $t_4$ causes the upstream oxygen sensor that is associated with $P_1$ to be exposed to combustion products of lean air-fuel mixtures in a first cylinder pair ($P_1$) so that it may be determined whether or not the upstream oxygen sensor that is associated with the first cylinder pair ($P_1$) responds with an indication of a lean air-fuel mixture. Further, the {L,L,R,R} command during time interval $t_4$ causes the upstream oxygen sensor that is associated with $P_2$ to be exposed to combustion products of lean air-fuel mixtures in a second cylinder pair ($P_2$) so that it may be determined whether or not the upstream oxygen sensor that is associated with the second cylinder pair ($P_2$) responds with an indication of a lean air-fuel mixture. The {R,R,L,L} command during time interval $t_3$ causes the upstream oxygen sensor that is associated with $P_3$ to be exposed to combustion products of lean air-fuel mixtures in a third cylinder pair ($P_3$) so that it may be determined whether or not the upstream oxygen sensor that is associated with the third cylinder pair ($P_3$) responds with an indication of a lean air-fuel mixture. Additionally, the {R,R,L,L} command during time interval $t_3$ causes the upstream oxygen sensor that is associated with $P_4$ to be exposed to combustion products of lean air-fuel mixtures in a fourth cylinder pair ($P_4$) so that it may be determined whether or not the upstream oxygen sensor that is associated with the fourth cylinder pair ($P_4$) responds with an indication of a lean air-fuel mixture.

As previously mentioned, the air-fuel sequence for diagnosing oxygen sensors as shown in FIG. 3 may be applied to determine a presence or absence of miswired upstream oxygen sensors. In particular, the {R,S,L,S} command during time interval $t_1$ generates a rich air-fuel mixture in the first cylinder pair ($P_1$) so that miswiring of the upstream oxygen sensor associated with the first cylinder pair ($P_1$) may be evaluated. The {S,R,S,L} command during time interval $t_2$ generates a rich air-fuel mixture in the second cylinder pair ($P_2$) so that miswiring of the upstream oxygen sensor associated with the second cylinder pair ($P_2$) may be evaluated. The {R,S,L,S} command during time interval $t_1$ generates a lean air-fuel mixture in the third cylinder pair ($P_3$) so that miswiring of the upstream oxygen sensor associated with the third cylinder pair ($P_3$) may be evaluated. The {S,R,S,L} command during time interval $t_2$ generates a lean air-fuel mixture in the fourth cylinder pair ($P_4$) so that miswiring of the upstream oxygen sensor associated with the fourth cylinder pair ($P_4$) may be evaluated. Thus, the sole rich/lean air-fuel ratio command on the $k^{th}$ cylinder pair ($P_k$) may result in a sole rich/lean reading at the $n^{th}$ controller input, where $k=n$ indicates that the oxygen sensor that is associated with $P_k$ is wired correctly to the $k^{th}$ controller input, where $k \neq n$ indicates that the oxygen sensor that is associated with $P_k$ is miswired to the $n^{th}$ controller input.

The sequence of commanded air-fuel ratios shown in FIG. 3 also allows the oxygen sensor diagnostic to verify whether or not each downstream oxygen sensor responds to combustion products of a rich air-fuel mixture. Specifically, the {R,R,L,L} command during time interval $t_3$ generates a rich air-fuel mixture in the first cylinder bank ($B_1$) so that the controller may determine whether or not the first downstream bank one oxygen sensor responds with a rich indication to the exhaust gases of rich air-fuel mixtures in the first bank of cylinders. Additionally, the {L,L,R,R} command during time interval $t_4$ generates a rich air-fuel mixture in the second cylinder bank ($B_2$) so that the controller may determine whether or not the downstream bank two oxygen sensor responds with a rich indication to the exhaust gases of rich air-fuel mixtures in the second bank of cylinders.

The sequence of commanded air-fuel ratios shown in FIG. 3 also allows the oxygen sensor diagnostic to verify whether or not each downstream oxygen sensor responds to combustion products of a lean air-fuel mixture. In particular, the {L,L,R,R} command during time interval $t_4$ generates a lean air-fuel mixture in the first cylinder bank ($B_1$) so that the controller may determine whether or not the first downstream bank one oxygen sensor responds with a lean indication to the exhaust gases of lean air-fuel mixtures in the first bank of cylinders. Also, the {R,R,L,L} command during time interval $t_3$ generates a lean air-fuel mixture in the second cylinder bank ($B_2$) so that the controller may determine whether or not the downstream bank two oxygen sensor responds with a lean indication to the exhaust gases of lean air-fuel mixtures in the second bank of cylinders.

The sequence of commanded air-fuel ratios shown in FIG. 3 also allows the oxygen sensor diagnostic to verify whether or not each downstream oxygen sensor is miswired. For example, the {R,R,L,L} command during time interval $t_3$ generates a rich air-fuel mixture in the first cylinder bank ($B_1$) so that the controller may determine miswiring of the downstream bank one oxygen sensor. A properly wired bank one downstream oxygen sensor would indicate rich during these conditions, whereas a miswired bank one downstream oxygen sensor would indicate lean when downstream oxygen sensor wires are swapped. Further, the {L,L,R,R} command during time interval $t_4$ generates a rich air-fuel mixture in the second cylinder bank ($B_2$) so that the controller may determine miswiring of the downstream bank two oxygen sensor. A properly wired bank two downstream oxygen sensor would indicate rich during these conditions, whereas a miswired bank two downstream oxygen sensor would indicate lean when downstream oxygen sensor wires are swapped.

The {S,S,S,S} command at time $t_0$ may be used to establish a reference oxygen sensor responses to all stoichiometric commands. The responses of the oxygen associated with following commands at times $t_1$, $t_2$, $t_3$ and $t_4$ may be evaluated relative to the reference response at time $t_0$. For example, if the output of oxygen sensor associated with the first cylinder pair was $\lambda$=1.02 at time $t_0$ (e.g., due to a 2% lean open-loop fueling error) and $\lambda$=0.92 at time $t_1$ (e.g., due to a 10% rich command), the relative response at time $t_1$ may be evaluated as a rich change in $\lambda$ equal to 0.1 (which more accurately matches the rich command). In other examples, the {S,S,S,S} command at time $t_0$ may be omitted, and response of oxygen sensors at times $t_1$, $t_2$, $t_3$ and $t_4$ are evaluated on an absolute basis.

It may be appreciated that the sequence or order of air-fuel ratio commands shown in FIG. 3 also affect the duration. For example, fuel commands during time interval $t_1$ {R,S,L,S} and time interval $t_2$ {S,R,S,L} are exclusively applied to identify miswirings of upstream oxygen sensors, and therefore, may have a relatively shorter duration (e.g., 1-3 seconds) due to relatively shorter exhaust transport delays from engine cylinders to the upstream oxygen sensors. Fuel commands during time interval $t_3$ {R,R,L,L} and time interval $t_4$ {L,L,R,R} are applied to verify downstream oxygen respond to rich and lean commands, and therefore, these commands may have a relatively longer duration (e.g., 3-5 sec.) due to catalyst oxygen storage and relatively longer exhaust transport delays. After time interval $t_3$, and before time interval $t_4$, the $1^{st}$ cylinder bank downstream oxygen sensor may respond rich exclusively after the double rich commands on $P_1$ and $P_2$ have sufficiently depleted the oxygen storage of the first cylinder bank catalyst. The preceding fuel commands at time intervals $t_1$ and $t_2$ included single rich and single stoichiometric air-fuel commands (i.e., an average rich command for $B_1$), and therefore, these commands would, at least partially, deplete the oxygen storage of the first cylinder bank catalyst before $t_3$, thereby shortening the duration needed for double rich commands after time interval $t_3$. Similarly, after time interval $t_3$, and before $t_4$, the $2^{nd}$ cylinder bank downstream oxygen sensor may respond lean exclusively after the double lean commands on $P_3$ and $P_4$ have sufficiently saturated the oxygen storage of the second bank catalyst. The preceding fuel commands at time intervals $t_1$ and $t_2$ included single lean and single stoichiometric air-fuel ratio commands (i.e., an average lean command for $B_2$), and therefore, would, at least partially, saturate the oxygen storage of the second bank catalyst before time interval $t_3$, thereby shortening the duration needed for double lean commands after time interval $t_3$. After time interval $t_4$, the $1^{st}$ bank downstream oxygen sensor may respond lean exclusively after the double lean commands on $P_1$ and $P_2$ have sufficiently saturated the oxygen storage of the first bank catalyst. The preceding double rich commands at time interval $t_3$ would have depleted the first bank catalyst oxygen storage, and therefore, lengthening the duration needed for double lean commands after time interval $t_4$. Similarly, after time interval $t_4$, the $2^{nd}$ bank downstream oxygen sensor may respond rich exclusively after the double rich commands on $P_3$ & $P_4$ have sufficiently depleted the second bank catalyst's oxygen storage. The preceding double lean commands at time interval $t_3$ would have saturated the second cylinder bank catalyst's oxygen storage, and therefore, lengthening the duration needed for double rich commands after time interval $t_4$. As a result, the order of these sets of fuel commands affects the total duration of the diagnostic. It may be desirable to minimize the switches from cylinder bank average lean to cylinder bank average rich, or vice versa, on consecutive sets of fuel commands on the same bank. Since the oxygen sensor diagnostic needs to verify that the downstream $O_2$ sensors respond to both lean and rich commands, one such switch (from average lean to average rich, or vice versa) is necessary. The order and selection of sets of fuel commands shown in FIG. 3 are desirable for reducing the total duration needed for the oxygen sensor diagnostic to complete.

Figure 4:
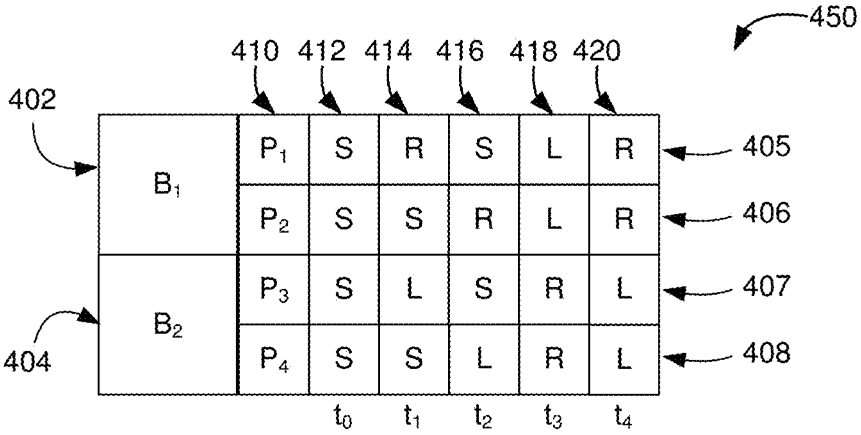

Turning now to FIG. 4, a second example a table 450 illustrating a first alternative air-fuel ratio sequence for diagnosing four different upstream oxygen sensors (UEGOs) is shown. Further, the air-fuel ratio sequence that is shown in FIG. 4 may be applied to diagnose two different downstream oxygen sensors (HEGOs). Table 450 includes a first cell 402 that brackets rows 405 and 406 to indicate that these rows and their associated columns are associated with the first bank of cylinders $B_1$. Table 450 also includes a second cell 404 that brackets rows 407 and 408 to indicate that these rows and their associated columns are associated with the second bank of cylinders $B_2$. Table 450 includes a first column 410 that houses indicators for cylinder pairs (e.g., $P_1$ indicates first cylinder pair (cylinders one and two), $P_2$ indicates second cylinder pair (cylinders three and four), $P_3$ indicates third cylinder pair (cylinders five and seven), and $P_4$ indicates fourth cylinder pair (cylinders six and eight)) that are associated with air-fuel ratios that are applied during phases of the oxygen sensor diagnostic sequence that is shown in Table 450. The five phases of the oxygen sensor diagnostic sequence are shown in columns 412-420.

The air-fuel ratio control sequence that is shown in FIG. 4 is similar to the sequence that is shown in FIG. 3. However, in the sequence in FIG. 4, entries in column 320 have been switched with entries in column 318 of table 350 shown in FIG. 3 to generate table 450. The entries in FIG. 4 that are the same as entries in FIG. 3 are equivalent. Therefore, repeating the description of these elements is omitted for the sake of brevity.

The sequence of FIG. 4 includes two lean/rich or rich/lean transitions or switches on consecutive sets of air-fuel ratio commands for a same bank of cylinders. This causes changing of an air-fuel ratio state from a catalyst state that is saturated or depleted of oxygen storage which may delay changing of downstream oxygen sensor states, thereby increasing the oxygen sensor diagnostic time duration. As such, the sequence of FIG. 4 may provide the same functionality as the sequence of FIG. 3, but it may increase an amount of time for the oxygen sensor diagnostic to execute.

Figure 5:
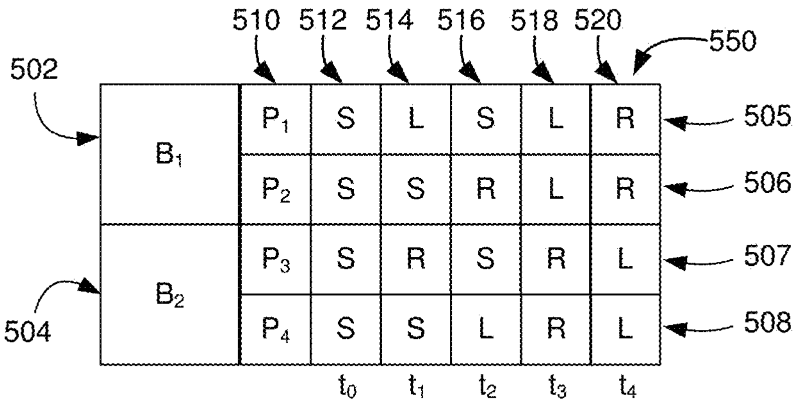

Moving on to FIG. 5, a third example a table 550 illustrating a second alternative air-fuel ratio sequence for diagnosing four different upstream oxygen sensors (UEGOs) is shown. Further, the air-fuel ratio sequence that is shown in FIG. 5 may be applied to diagnose two different downstream oxygen sensors (HEGOs). Table 550 includes a first cell 502 that brackets rows 505 and 506 to indicate that these rows and their associated columns are associated with the first bank of cylinders $B_1$. Table 550 also includes a second cell 504 that brackets rows 507 and 508 to indicate that these rows and their associated columns are associated with the second bank of cylinders $B_2$. Table 550 includes a first column 510 that houses indicators for cylinder pairs (e.g., $P_1$ indicates first cylinder pair (cylinders one and two), $P_2$ indicates second cylinder pair (cylinders three and four), $P_3$ indicates third cylinder pair (cylinders five and seven), and $P_4$ indicates fourth cylinder pair (cylinders six and eight)) that are associated with air-fuel ratios that are applied during phases of the oxygen sensor diagnostic sequence that is shown in Table 550. The five phases of the oxygen sensor diagnostic sequence are shown in columns 512-520.

The air-fuel ratio control sequence that is shown in FIG. 5 is similar to the sequence that is shown in FIG. 3. However, in the sequence in FIG. 5, column entries have been switched. The entries in FIG. 5 that are the same as entries in FIG. 3 are equivalent. Therefore, repeating the description of these elements is omitted for the sake of brevity.

The sequence of FIG. 5 increases the actual total number of lean/rich or rich/lean transitions or switches on consecutive sets of air-fuel ratio commands for a same bank of cylinders. This causes changing of an air-fuel ratio state from a catalyst state that is saturated or depleted of oxygen storage which may delay changing of downstream oxygen sensor states, thereby increasing the oxygen sensor diagnostic time duration. As such, the sequence of FIG. 5 may provide the same functionality as the sequence of FIG. 3, but it may increase an amount of time for the oxygen sensor diagnostic to execute.

Figure 6:
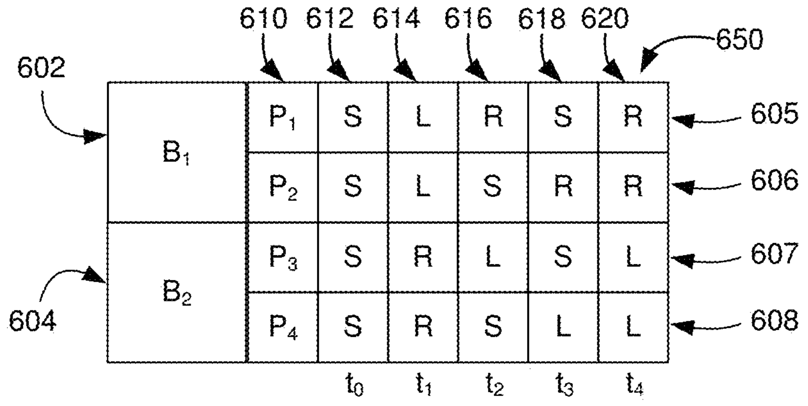

Referring now to FIG. 6, a fourth example a table 650 illustrating a third alternative air-fuel ratio sequence for diagnosing four different upstream oxygen sensors (UEGOs) is shown. The air-fuel ratio sequence that is shown in FIG. 6 may also be applied to diagnose two different downstream oxygen sensors (HEGOs). Table 650 includes a first cell 602 that brackets rows 605 and 606 to indicate that these rows and their associated columns are associated with the first bank of cylinders $B_1$. Table 650 also includes a second cell 604 that brackets rows 607 and 608 to indicate that these rows and their associated columns are associated with the second bank of cylinders $B_2$. Table 650 includes a first column 610 that houses indicators for cylinder pairs (e.g., $P_1$ indicates first cylinder pair (cylinders one and two), $P_2$ indicates second cylinder pair (cylinders three and four), $P_3$ indicates third cylinder pair (cylinders five and seven), and $P_4$ indicates fourth cylinder pair (cylinders six and eight)) that are associated with air-fuel ratios that are applied during phases of the oxygen sensor diagnostic sequence that is shown in Table 650. The five phases of the oxygen sensor diagnostic sequence are shown in columns 612-620.

The air-fuel ratio control sequence that is shown in FIG. 6 is similar to the sequence that is shown in FIG. 3. However, in the sequence in FIG. 6, column entries have been switched. The entries in FIG. 6 that are the same as entries in FIG. 3 are equivalent. Therefore, repeating the description of these elements is omitted for the sake of brevity.

The sequence of FIG. 6 provides for an actual total number of one lean/rich or rich/lean transition or switch on consecutive sets of air-fuel ratio commands for a same bank of cylinders. As such, the sequence of FIG. 6 may provide the same functionality as the sequence of FIG. 3 and lower an amount of time for the oxygen sensor diagnostic to execute (compared to the sequences of FIG. 4 and FIG. 5).

Figure 7:
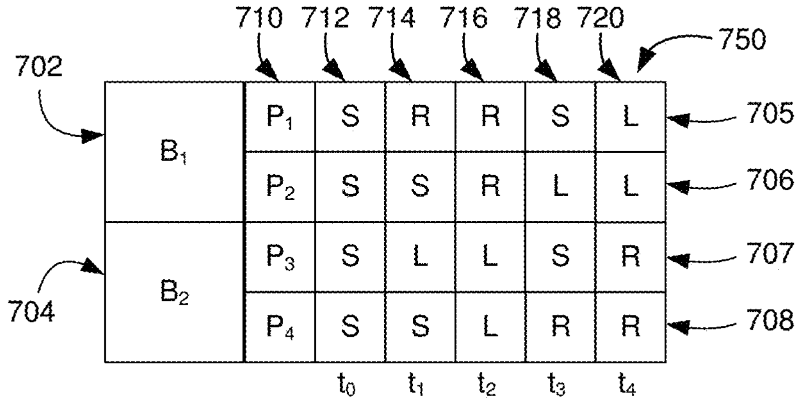
Figure 8:
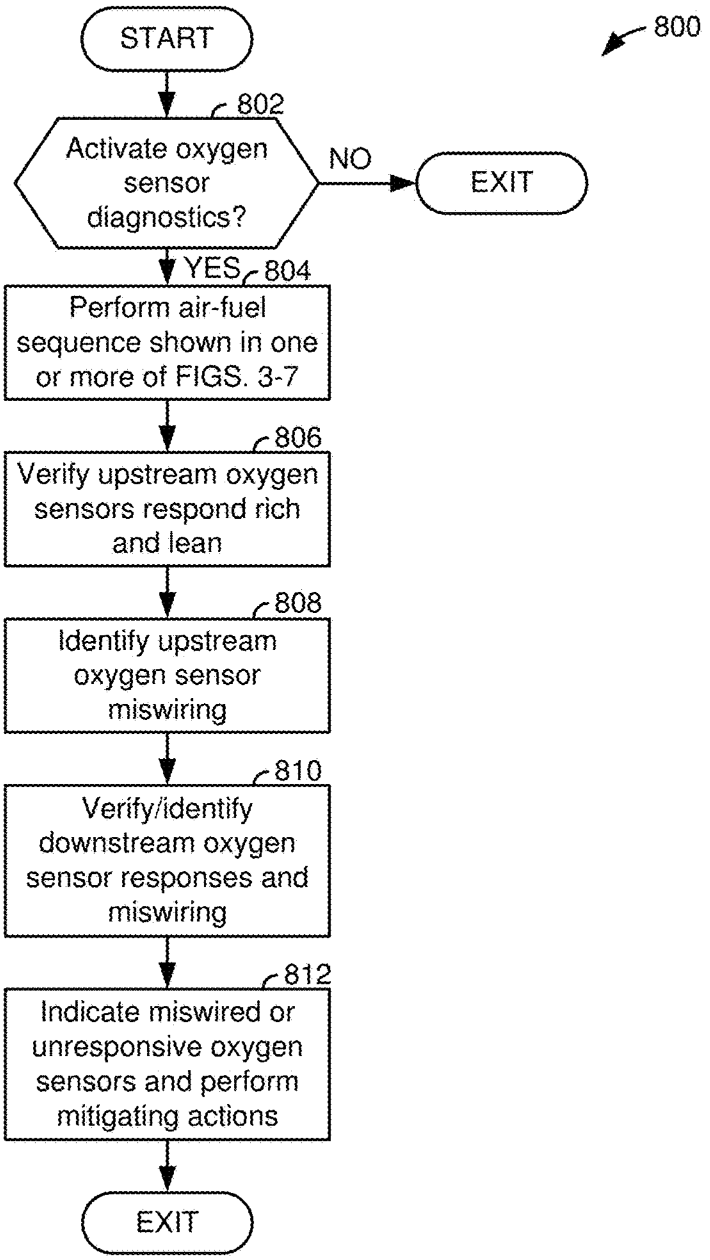
FIG. 8 shows a flowchart of an example method for operating an engine and diagnosing oxygen sensors.

Referring now to FIG. 7, a fifth example a table 750 illustrating a third alternative air-fuel ratio sequence for diagnosing four different upstream oxygen sensors (UEGOs) is shown. The air-fuel ratio sequence that is shown in FIG. 7 may also be applied to diagnose two different downstream oxygen sensors (HEGOs). Table 750 includes a first cell 702 that brackets rows 705 and 706 to indicate that these rows and their associated columns are associated with the first bank of cylinders $B_1$. Table 750 also includes a second cell 704 that brackets rows 707 and 708 to indicate that these rows and their associated columns are associated with the second bank of cylinders $B_2$. Table 750 includes a first column 710 that houses indicators for cylinder pairs (e.g., $P_1$ indicates first cylinder pair (cylinders one and two), $P_2$ indicates second cylinder pair (cylinders three and four), $P_3$ indicates third cylinder pair (cylinders five and seven), and $P_4$ indicates fourth cylinder pair (cylinders six and eight)) that are associated with air-fuel ratios that are applied during phases of the oxygen sensor diagnostic sequence that is shown in Table 750. The five phases of the oxygen sensor diagnostic sequence are shown in columns 712-720.

The air-fuel ratio control sequence that is shown in FIG. 7 is similar to the sequence that is shown in FIG. 3. However, in the sequence in FIG. 7, column entries have been switched. The entries in FIG. 7 that are the same as entries in FIG. 3 are equivalent. Therefore, repeating the description of these elements is omitted for the sake of brevity.

The sequence of FIG. 7 provides for an actual total number of one lean/rich or rich/lean transition or switch on consecutive sets of air-fuel ratio commands for a same bank of cylinders. As such, the sequence of FIG. 7 may provide the same functionality as the sequence of FIG. 3 and lower an amount of time for the oxygen sensor diagnostic to execute (compared to the sequences of FIG. 4 and FIG. 5).

Referring now to FIG. 8, a method 800 for operating an engine and diagnosing oxygen sensors cylinder imbalance is shown. The method of FIG. 8 may be incorporated into the system of FIGS. 1 and 2 as executable instructions stored in non-transitory memory. The method of FIG. 8 may cause the controller shown in FIG. 1 to receive inputs from one or more sensors described herein and adjust positions or operating states of one or more actuators described herein in the physical world. Method 800 may be executed when the engine is rotating and combusting fuel.

At 802, method 800 judges whether or not the oxygen diagnostic is to be activated. If method 800 judges to activate the oxygen sensor diagnostic, the answer is yes and method 800 proceeds to 804. Otherwise, the answer is no and method 800 exits. In one example, method 800 may activate the oxygen sensor diagnostic during select vehicle operating conditions that may include one or more of the following: an end of assembly line diagnostic request, an amount of time passing since a most recently performed oxygen sensor diagnostic, and request from a diagnostic tool, and unexpected oxygen sensor behavior.

At 804, method 800 perturbs cylinder air-fuel ratios of two cylinder banks according to the air-fuel sequences shown in one of FIGS. 3-7 or subsets of these sequences. Thus, method 800 may include at least four different cylinder air-fuel ratio patterns, but less than six different cylinder air-fuel ratio patterns, in two pairs of cylinders during at least four different time intervals of an oxygen sensor diagnostic. The air-fuel sequences of the cylinders and cylinder banks may be arranged in an order to reduce the execution time of the oxygen sensor diagnostic. For example, the air-fuel ratio changes may be arranged to reduce repeated filling and depleting of oxygen from catalysts so that operating states of downstream oxygen sensors generated in response to cylinder air-fuel ratios may be determined with less delay. Method 800 proceeds to 806.

At 806, method 800 determines whether or not upstream oxygen sensors correctly respond to changes in cylinder air-fuel ratios. For example, and as discussed with regard to FIG. 3, if method 800 commands a cylinder pair air-fuel ratio rich and an upstream oxygen sensor associated with the cylinder pair indicates rich exhaust gases at a controller input, the upstream oxygen sensor associated with the cylinder pair may be determined to respond to combusted rich air-fuel mixtures. In this way, outputs of oxygen sensors may be compared to table entries to determine whether or not an oxygen sensor may be degraded. If the upstream oxygen sensor associated with the cylinder pair indicates lean or stoichiometric exhaust gases, method 800 may determine that the upstream oxygen sensor associated with the cylinder pair does not respond to rich exhaust gases. The upstream oxygen sensors may be evaluated for being able to respond to lean exhaust gases generated from lean air-fuel mixtures in a similar way by commanding the cylinder pair to combust lean air-fuel mixtures and judging whether or not the oxygen sensor associated with the cylinder pair responds to lean exhaust gases. Oxygen sensors for each cylinder pair may be evaluated in a similar way as the cylinder's air-fuel ratios are adjusted according to the air-fuel sequences of step 804. Method 800 proceeds to 808.

At 808, method 800 determines whether or not upstream oxygen sensors are miswired. For example, method 800 may determine if output of upstream oxygen sensor number one is correctly wired to input of the controller that is associated with the first upstream oxygen sensor or upstream oxygen sensor number one or miswired to a different controller input. Thus, if method 800 commands a first cylinder pair air-fuel ratio rich and first upstream oxygen sensor associated with a first cylinder pair indicates rich exhaust gases, the first upstream oxygen sensor associated with the cylinder pair may be determined to be wired properly. However, if the controller input that is associated with the first upstream oxygen sensor outputs a lean or stoichiometric signal and a controller input that is associated with a different upstream oxygen sensor switches to indicate rich, method 800 may determine that the first upstream oxygen sensor is miswired to the controller. In this way, outputs of oxygen sensors may be compared to table entries and/or air-fuel ratio changes between table entries to determine whether or not an oxygen sensor is properly wired. Method 800 may perform additional similar analysis for each of the upstream oxygen sensors.

At 810, method 800 determines whether or not downstream oxygen sensors correctly respond to changes in cylinder air-fuel ratios and whether or not the downstream oxygen sensors are properly wired. In one example, and as discussed with regard to FIG. 3, method 800 may command two cylinder pairs, or a cylinder bank, to combust rich air-fuel ratios. The downstream oxygen sensor associated with the cylinder bank may be determined to respond to combusted rich air-fuel mixtures if the downstream oxygen sensor indicates rich exhaust gases at a controller input that is associated with the downstream oxygen sensor. If the downstream oxygen sensor associated with the cylinder bank indicates rich exhaust gases, method 800 may determine that the downstream oxygen sensor associated with the cylinder bank responds to rich exhaust gases. However, if the downstream oxygen sensor associated with the cylinder bank indicates lean or stoichiometric exhaust gases, method 800 may determine that the downstream oxygen sensor associated with the cylinder bank may not respond to rich exhaust gases. Further, if the controller input that is associated with the downstream oxygen sensor does not indicate rich and a different controller input switches to rich, method 800 may judge that the downstream oxygen sensor associated with the first cylinder bank is miswired. Both downstream oxygen sensors may be evaluated in this way. Method 800 proceeds to 812.

At 812, method 800 may display oxygen sensors that do not respond as expected or that are determined to be miswired to a human/machine interface (e.g., 171 of FIG. 1). Further, method 800 may perform mitigating actions. The mitigating actions may include but are not limited to engine fuel command adjustments and controller modifications. For example, if method 800 determines that the first bank downstream oxygen sensor is wired to the controller input for the second bank downstream oxygen sensor, the controller may adjust fueling supplied to the first bank of cylinders according to the controller input that is supposed to be associated with the downstream oxygen sensor of the second bank of cylinders. Further, the controller may adjust fueling supplied to the second bank of cylinders according to the controller input that is supposed to be associated with the downstream oxygen sensor of the first bank of cylinders. If an upstream oxygen sensor does not respond to a rich or lean commanded pair of cylinders, the air-fuel ratios of the cylinders that are associated with the unresponsive oxygen sensor may be controlled responsive to output of a different upstream oxygen sensor. In this way, it may be possible to maintain some control over engine cylinders that are associated with an unresponsive upstream oxygen sensor. Method 800 proceeds to exit.

In this way, operation of several upstream oxygen sensors may be diagnosed simultaneously with diagnosing operation of downstream oxygen sensors. Further, the air-fuel command sequences described herein provide for identifying specific oxygen sensors for degradation and/or proper operation. Additionally, the air-fuel commands described herein provide for reducing an amount of time it takes to diagnose both upstream and downstream oxygen sensors.

The method of FIG. 8 provides for a method for operating an engine, comprising: commanding each of two groups of fuel injectors to generate one of a stoichiometric, rich, or lean air-fuel ratio in each of two pairs of cylinders and to generate at least four different cylinder air-fuel ratio patterns in the two pairs of cylinders during at least four different time intervals of an oxygen sensor diagnostic. In a first example, the method further comprises comparing outputs of two upstream oxygen sensors to the at least four different cylinder air-fuel ratio patterns and identifying a presence or absence of miswiring of each of two upstream oxygen sensors. In a second example that may include the first example, the method further comprises comparing outputs of two upstream oxygen sensors to the at least four different cylinder air-fuel ratio patterns and identifying a presence or absence of degradation of each of two upstream oxygen sensors. In a third example that may include one or both of the first and second examples, the method further comprises comparing outputs of a downstream oxygen sensor to the at least four different cylinder air-fuel ratio patterns and identifying a presence or absence of miswiring of the downstream oxygen sensor. In a fourth example that may include one or more of the first through third examples, the method further comprises comparing outputs of a downstream oxygen sensors to the at least four different cylinder air-fuel ratio patterns and identifying a presence or absence of degradation of the downstream oxygen sensors. In a fifth example that may include one or more of the first through fourth examples, the method includes where the at least four different cylinder air-fuel ratio patterns are arranged in an order to reduce an amount of time it takes to execute the oxygen sensor diagnostic. In a sixth example that may include one or more of the first through fifth examples, the method further comprises commanding each of two other groups of fuel injectors to generate one of the stoichiometric, rich, or lean air-fuel ratio in each of other two pairs of cylinders and to generate a second group of at least four different cylinder air-fuel ratio patterns in the other two pairs of cylinders during the at least four different time intervals of the oxygen sensor diagnostic. In a seventh example that may include one or more of the first through sixth examples, the method further comprises comparing outputs of a downstream oxygen sensors to the second group of at least four different cylinder air-fuel ratio patterns and identifying a presence or absence of degradation of the downstream oxygen sensors.

The method of FIG. 8 also provides for a method for operating an engine, comprising: commanding a maximum of one rich to lean, or one lean to rich, air-fuel ratio change in a pair of engine cylinders during an oxygen sensor diagnostic sequence that is a basis for determining miswiring of four upstream oxygen sensors and comparing outputs of the four upstream oxygen sensors to air-fuel ratio changes performed during the oxygen sensor diagnostic sequence. In a first example, the method includes where the oxygen sensor diagnostic sequence includes at least four different cylinder air-fuel ratio patterns. In a second example that may include the first example, the method further comprises comparing outputs of the four upstream oxygen sensors to the at least four different cylinder air-fuel ratio patterns. In a third example that may include one or both of the first and second examples, the method further comprises indicating degradation of one of the four upstream oxygen sensors in response to a difference between the at least four different cylinder air-fuel ratio patterns and output of one of the four upstream oxygen sensors. In a fourth example that may include one or more of the first through third examples, the method includes commanding a maximum of one rich to lean, or one lean to rich, air-fuel ratio change includes adjusting fuel injector operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method, comprising:

operating an engine having a first bank of cylinders and a second bank of cylinders, the engine including a first upstream oxygen sensor associated with a first pair of cylinders of the first bank, a second upstream oxygen sensor associated with a second pair of cylinders of the first bank, a third upstream oxygen sensor associated with a first pair of cylinders of the second bank, and a fourth upstream oxygen sensor associated with a second pair of cylinders of the second bank; and perturbing cylinder air-fuel ratios of the first and second cylinder banks according to a first air-fuel ratio sequence and a second, different, air-fuel ratio sequence, including commanding each of four groups of fuel injectors to generate one of a stoichiometric, rich, or lean air-fuel ratio in each of four pairs of cylinders to generate at least four different cylinder air-fuel ratio patterns in the four pairs of cylinders during at least four different time intervals of an oxygen sensor diagnostic, wherein each of the first air-fuel ratio sequence and the second air-fuel ratio sequence enables identification of a presence or absence of miswiring of each of the first upstream oxygen sensor, the second upstream oxygen sensor, the third upstream oxygen sensor, and the fourth upstream oxygen sensor, and wherein the first air-fuel ratio sequence includes fewer lean-to-rich or rich-to-lean air-fuel ratio transitions on consecutive air-fuel ratio commands for a same bank of cylinders than the second air-fuel ratio sequence.

2. The method of claim 1, further comprising comparing outputs of the first upstream oxygen sensor, the second upstream oxygen sensor, the third upstream oxygen sensor, and the fourth upstream oxygen sensor to the at least four different cylinder air-fuel ratio patterns and identifying a presence or absence of miswiring of each of the first upstream oxygen sensor, the second upstream oxygen sensor, the third upstream oxygen sensor, and the fourth upstream oxygen sensor.

3. The method of claim 1, further comprising comparing outputs of the first upstream oxygen sensor, the second upstream oxygen sensor, the third upstream oxygen sensor, and the fourth upstream oxygen sensor to the at least four different cylinder air-fuel ratio patterns and identifying a presence or absence of degradation of each of the first upstream oxygen sensor, the second upstream oxygen sensor, the third upstream oxygen sensor, and the fourth upstream oxygen sensor.

4. The method of claim 1, further comprising comparing outputs of a downstream oxygen sensor to the at least four different cylinder air-fuel ratio patterns and identifying a presence or absence of miswiring of the downstream oxygen sensor.

5. The method of claim 1, further comprising comparing outputs of downstream oxygen sensors to the at least four different cylinder air-fuel ratio patterns and identifying a presence or absence of degradation of the downstream oxygen sensors.

6. The method of claim 1, further comprising comparing outputs of a downstream oxygen sensors to the second group of at least four different cylinder air-fuel ratio patterns and identifying a presence or absence of degradation of the downstream oxygen sensors.

7. An engine system, comprising:

an internal combustion engine comprising a first bank of cylinders and a second bank of cylinders, and at least eight fuel injectors including at least one fuel injector for each cylinder of the first bank of cylinders and at least one fuel injector for each cylinder of the second bank;

a first oxygen sensor configured to sense gases exhausted from first and second cylinders of the first bank of cylinders;

a second oxygen sensor configured to sense gases exhausted from third and fourth cylinders of the first bank of cylinders;

a third oxygen sensor configured to sense gases exhausted from fifth and sixth cylinders of the second bank of cylinders;

a fourth oxygen sensor configured to sense gases exhausted from seventh and eighth cylinders of the second bank of cylinders;

a controller including executable instructions stored in non-transitory memory that cause the controller to command the at least eight fuel injectors to generate one of a stoichiometric, rich, or lean air-fuel ratio in each cylinder of the first bank of cylinders and each cylinder of the second bank and to generate at least four different cylinder air-fuel ratio patterns in the first bank of cylinders and the second bank of cylinders during at least four different time intervals of an oxygen sensor diagnostic sequence.

8. The engine system of claim 7, where the at least four different cylinder air-fuel ratio patterns are arranged in an order to reduce a time duration of the oxygen sensor diagnostic sequence.

9. The engine system of claim 7, further comprising additional executable instructions that cause the controller to compare outputs of the first oxygen sensor, the second oxygen sensor, the third oxygen sensor, and the fourth oxygen sensor to the at least four different cylinder air-fuel ratio patterns and identify a presence or absence of miswiring of each of the first oxygen sensor, the second oxygen sensor, the third oxygen sensor, and the fourth oxygen sensor.

10. The engine system of claim 7, further comprising additional executable instructions that cause the controller to compare outputs of the first oxygen sensor, the second oxygen sensor, the third oxygen sensor, and the fourth oxygen sensor to the at least four different cylinder air-fuel ratio patterns and identify a presence or absence of degradation of each of the first oxygen sensor, the second oxygen sensor, the third oxygen sensor, and the fourth oxygen sensor.

11. The engine system of claim 10, further comprising a first downstream oxygen sensor arranged in a fifth exhaust passage and comparing outputs of the first downstream oxygen sensor to the at least four different cylinder air-fuel ratio patterns and additional executable instructions for identifying a presence or absence of miswiring of the first downstream oxygen sensor.

12. The engine system of claim 11, further comprising a second downstream oxygen sensor arranged in a sixth exhaust passage and additional executable instructions for comparing outputs of the second downstream oxygen sensor to the at least four different cylinder air-fuel ratio patterns and identifying the presence or absence of miswiring of the second downstream oxygen sensor.

13. The engine system of claim 12, further comprising additional executable instructions that cause the controller to indicate the presence or absence of degradation of each of the first downstream oxygen sensor and the second downstream oxygen sensor.

14. A method for operating an engine, comprising:

commanding a maximum of one rich to lean, or one lean to rich, air-fuel ratio change in a pair of engine cylinders during an oxygen sensor diagnostic sequence that is a basis for determining miswiring of four upstream oxygen sensors and comparing outputs of the four upstream oxygen sensors to air-fuel ratio changes performed during the oxygen sensor diagnostic sequence.

15. The method of claim 14, where the oxygen sensor diagnostic sequence includes at least four different cylinder air-fuel ratio patterns.

16. The method of claim 15, further comprising comparing outputs of the four upstream oxygen sensors to the at least four different cylinder air-fuel ratio patterns.

17. The method of claim 16, further comprising indicating degradation of one of the four upstream oxygen sensors in response to a difference between the at least four different cylinder air-fuel ratio patterns and output of one of the four upstream oxygen sensors.

18. The method of claim 14, commanding a maximum of one rich to lean, or one lean to rich, air-fuel ratio change includes adjusting fuel injector operation.

* * * * *